(12) United States Patent
Schmitt et al.

(10) Patent No.: US 10,562,506 B2
(45) Date of Patent: Feb. 18, 2020

(54) BRAKE PRESSURE CONTROL UNIT

(71) Applicant: Continental Teves AG & Co. oHG, Frankfurt (DE)

(72) Inventors: Pierre Schmitt, Karlstadt (DE); Johannes Görlach, Langgöns (DE); Svend Pakleppa, Laudenbach (DE); Kristijan Tarandek, Neu-Isenburg (DE); Theo Baukholt, Kriftel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 36 days.

(21) Appl. No.: 15/779,620

(22) PCT Filed: Nov. 17, 2016

(86) PCT No.: PCT/EP2016/078042
§ 371 (c)(1),
(2) Date: May 29, 2018

(87) PCT Pub. No.: WO2017/093040
PCT Pub. Date: Jun. 8, 2017

(65) Prior Publication Data
US 2018/0345940 A1    Dec. 6, 2018

(30) Foreign Application Priority Data

Dec. 2, 2015 (DE) .......................... 10 2015 224 022
May 25, 2016 (DE) .......................... 10 2016 209 108

(51) Int. Cl.
*B60T 13/74* (2006.01)
*B60T 17/00* (2006.01)

(52) U.S. Cl.
CPC ............ *B60T 13/745* (2013.01); *B60T 13/74* (2013.01); *B60T 17/00* (2013.01)

(58) Field of Classification Search
CPC .......... B60T 17/00; B60T 17/02; B60T 13/74; B60T 13/745
USPC ...................................................... 303/10, 20
See application file for complete search history.

(56) References Cited

U.S. PATENT DOCUMENTS 2,218,605 A * 10/1940 Down ..................... B60T 13/74
                                                    188/173
5,143,429 A * 9/1992 Higashimata ....... B60T 8/17616
                                                    303/115.2
(Continued)

FOREIGN PATENT DOCUMENTS

DE    3803079 A1    8/1989
DE    4415438 A1    11/1995
(Continued)

OTHER PUBLICATIONS

Korean Office Action for Korean Application No. 10-2018-7015288, dated Jun. 14, 2019, with translation, 13 pages.
(Continued)

*Primary Examiner* — Thomas J Williams
(74) *Attorney, Agent, or Firm* — RatnerPrestia

(57) ABSTRACT

A brake pressure control unit for a motor vehicle brake system, having an electric motor, the rotational movement of which is transformed by a ball screw drive into a translational movement of a piston, in order for it to be possible to build up a defined brake pressure in a wheel brake independently of the actuation of a brake master cylinder. The electric motor is received in a first housing and the piston is received in a second housing which is arranged diametrically with respect to the first housing, and a third housing with two diametrical end surfaces is arranged between the first and the second housing, on which end surfaces the first and the second housing are fixed.

7 Claims, 1 Drawing Sheet

(56) References Cited

U.S. PATENT DOCUMENTS

| | | | |
|---|---|---|---|
| 5,433,514 A * | 7/1995 | Tsukamoto | B60T 8/175 303/113.2 |
| 5,720,531 A * | 2/1998 | Fulks | F16H 25/2427 303/115.2 |
| 5,758,930 A | 6/1998 | Schiel et al. | |
| 6,679,565 B2 * | 1/2004 | Riddiford | B60T 7/042 303/15 |
| 9,108,610 B2 | 8/2015 | Philippe et al. | |
| 9,446,753 B2 | 9/2016 | Feigel et al. | |
| 9,834,188 B2 | 12/2017 | Feigel | |
| 2008/0258544 A1 * | 10/2008 | Iyatani | B60T 8/368 303/10 |
| 2009/0045672 A1 | 2/2009 | Nishino et al. | |
| 2014/0090371 A1 | 4/2014 | Yoshizu et al. | |
| 2014/0216866 A1 | 8/2014 | Feigel et al. | |
| 2015/0061362 A1 | 3/2015 | Kikawa et al. | |
| 2015/0076972 A1 | 3/2015 | Leiber et al. | |
| 2015/0203087 A1 | 7/2015 | Ozsoylu et al. | |
| 2016/0272181 A1 * | 9/2016 | Lee | F04B 17/03 |

FOREIGN PATENT DOCUMENTS

| | | | |
|---|---|---|---|
| DE | 102012213216 A1 | 2/2013 | |
| DE | 102013223859 A1 | 5/2015 | |
| EP | 2000376 A1 | 12/2008 | |
| EP | 2824006 A1 | 1/2015 | |
| FR | 2947228 A1 | 12/2010 | |
| GB | 2279125 A * | 12/1994 | B60T 13/745 |
| KR | 20140054225 A | 5/2014 | |
| KR | 20150026856 A | 3/2015 | |
| WO | 8903782 A1 | 5/1989 | |
| WO | 2013156391 A1 | 10/2013 | |
| WO | 2013179746 A1 | 12/2013 | |

OTHER PUBLICATIONS

International Search Report and Written Opinion for International Application No. PCT/EP2016/078042, dated Feb. 9, 2017, 9 pages.
German Search Report for German Application No. 10 2016 209 108.5, dated May 3, 2017, including partial English translation, 11 pages.

* cited by examiner

BRAKE PRESSURE CONTROL UNIT

CROSS REFERENCE TO RELATED APPLICATIONS

This application is the U.S. National Phase Application of PCT International Application of PCT/EP2016/078042, filed Nov. 17, 2016, which claims priority to German Patent Application No. 10 2015 224 022.3, filed Dec. 2, 2015 and German Patent Application No. 10 2016 209 108.5, filed May 25, 2016, the contents of such applications being incorporated by reference herein.

FIELD OF THE INVENTION

The invention relates to a brake pressure control unit for a motor vehicle brake system.

BACKGROUND OF THE INVENTION

A brake pressure control unit for a motor vehicle brake system of the stated type is known from DE 10 2013 223 859 A1, incorporated by reference herein. The brake pressure control unit has an electric motor, the rotational movement of which is transformed into a translational movement of a piston in order to be able to build up a defined brake pressure in a wheel brake independently of the actuation of a master brake cylinder.

SUMMARY OF THE INVENTION

An aspect of the invention is a brake pressure control unit of the stated type to be particularly compact and reliable using the simplest possible structural means.

BRIEF DESCRIPTION OF THE DRAWINGS

Further features of the invention emerge from the individual patent claims and from the description of an exemplary embodiment on the basis of three drawings.

In the drawings.

DETAILED DESCRIPTION OF THE PREFERRED EMBODIMENTS

Figure 1:
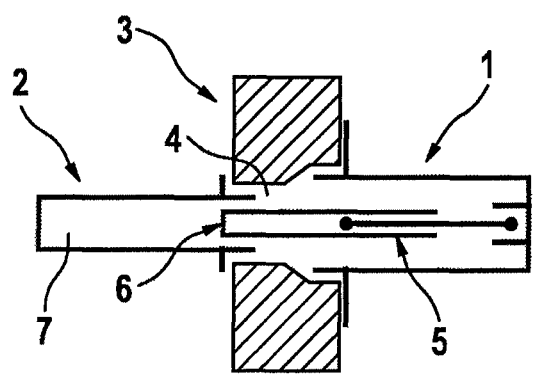
FIG. 1 shows a schematic construction of the brake pressure control unit according to an aspect of the invention in longitudinal section.

In detail, FIG. 1 shows a schematic construction of the brake pressure control unit according to an aspect of the invention in longitudinal section, having an electric motor, the rotational movement of which is transformed by means of a ball screw drive 5 into a translational movement of piston 6 in order to be able to build up a defined brake pressure in a wheel brake independently of the actuation of a master brake cylinder.

To realize as simple and functionally reliable a construction as possible for a brake pressure control unit, an aspect of the invention provides that the electric motor is accommodated in a first housing 1 and the piston 6 is accommodated in a second housing 2, for which purpose the second housing 2 is arranged diametrically opposite the first housing 1, wherein, between the first and second housings 1, 2, there is arranged a third housing 3 with two diametric face surfaces to which the first and second housings 1, 2 are fixed. The third housing 3 thus performs the function of a central housing, on which all further components of the brake pressure control unit, which are to be discussed in more detail below, are arranged.

As can also be seen from FIG. 1, the third housing 3 designed as a central housing has a passage bore 4 for the leadthrough of the ball screw drive 5, such that, in conjunction with the piston 6 arranged in the second housing 2, the function of a linear actuator is ensured by means of a particularly compact design of the brake pressure control unit.

Figure 2:
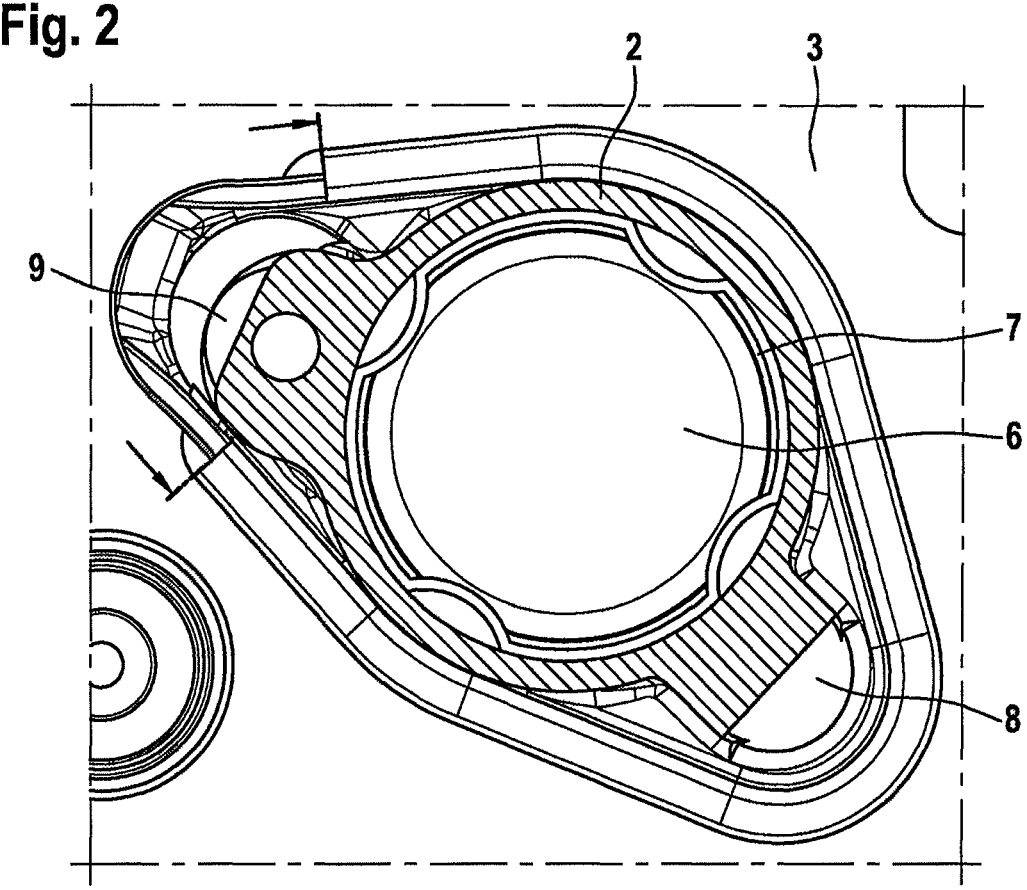
FIG. 2 shows, in a plan view proceeding from FIG. 1, an expedient construction of the second housing which is fixed to the third housing and in which the piston of the linear actuator is accommodated.

FIG. 2 shows, in a plan view proceeding from FIG. 1, an expedient construction of the second housing 2 which is fixed to the third housing 3 and in which the piston 6 of the linear actuator is guided in a precise manner. For this purpose, the second housing 2 is formed as a working cylinder which is closed in a pot-like manner, adjacent to the main opening 7, for the delivery of pressure medium by the piston 6, of which working cylinder there are provided, in the second housing 2, a first housing section 8 for accommodating a delivery duct and a second housing section 9 for accommodating a suction duct.

Figure 3:
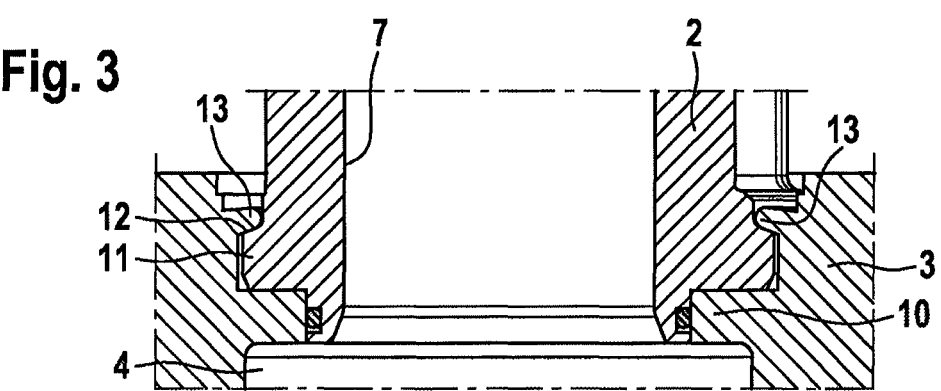
FIG. 3 shows, in a longitudinal view, the detail illustrated in FIG. 2 of the depicted brake pressure control unit for the purposes of illustrating the calking point provided between the second and the third housing.

Furthermore, FIG. 3 shows, in a longitudinal view, the detail illustrated in FIG. 2 of the partially depicted brake pressure control unit for the purposes of illustrating the calking point 13 provided between the second and the third housing 2, 3. For this purpose, the passage bore 4 provided in the third housing 3 has a bore step 10 which faces toward the second housing 2 and on which the second housing 2 is supported axially by means of its collar 11. To be able to fix the second housing 2 at least in sections in positively locking and/or non-positively locking fashion along its collar 11 in the passage bore 4, the third housing 3 is produced from a plastically deformable material which, for the fixing of the second housing 2 to the third housing 3, is displaced, as per the figure, onto an oblique shoulder 12 formed on the collar 11, for which purpose, in the region of the calking point 13, a calking tool (not illustrated in any more detail) is used which deforms the plastically displaceable material of the housing 3 into the form of a lug.

The calking permits the closure and simultaneously also the sealing of three bores (main opening 7 for the piston 6, and of the suction and delivery duct formed in the two housing sections 8, 9, for which purpose the cross section of the housing 2 is of oval form in the region of the outer contour) in the third housing 3 in a single working process, because also, in each case, the suction and delivery duct arranged in the second housing 2 in the housing sections 8, 9 and connected to the main opening 7 opens into the third housing 3.

The calking permits a two-part construction. The second and third housings 2, 3 can thus be manufactured separately and subsequently connected. This allows the second housing 2 to be produced by casting as a pot-shaped blank, with subsequent fine machining. This measure represents an economically and technically preferred solution for use in brake systems. The separate design has the result that, firstly, greater freedom is possible with regard to the machining, and secondly, said housings 2, 3 can, in a manner suited to automation, be produced economically by means of four axes on conventional manufacturing lines.

The third housing 3 also benefits from the separate design: The pressure modulation valves required for the closed-loop control of the wheel brake pressure and the associated hydraulic ducts can be realized by means of calking using proven tools and in standard receptacles in the third housing 3.

For a fastening of the second housing 2 to the third housing 3 which is as easy to handle as possible, attention should thus be paid to the selection of the materials to be used for the second and third housings 2, 3, for which purpose, according to an aspect of the invention, the second housing 2 is produced from as hard a material as possible, preferably cast metal, whereas the third housing 3 is composed of a soft material, preferably of a light metal alloy, for which a wrought aluminum alloy produced in an extrusion process is preferably suitable. For the closed-loop control of the brake pressure in in each case one wheel brake, multiple electromagnetically actuatable pressure modulation valves are arranged in the third housing 3, which pressure modulation valves are in each case connected via a wheel brake port provided in the third housing 3 to the associated wheel brake. For the actuation of the pressure modulation valves, the third housing 3 generally carries a control unit which is mounted directly onto the pressure modulation valves.

LIST OF REFERENCE DESIGNATIONS

1 Housing
2 Housing
3 Housing
4 Passage bore
5 Ball screw drive
6 Piston
7 Main opening
8 Housing section
9 Housing section
10 Bore step
11 Collar
12 Oblique shoulder
13 Calking point

The invention claimed is:

1. A brake pressure control unit for a motor vehicle brake system, having an electric motor, a rotational movement of which is transformed by a ball screw drive into a translational movement of a piston in order to be able to build up a defined brake pressure in a wheel brake independently of the actuation of a master brake cylinder, wherein the electric motor is accommodated in a first housing and the piston is accommodated in a second housing which is arranged diametrically opposite the first housing, and, between the first and second housings, there is arranged a third housing with two diametric face surfaces to which the first and second housings are fixed, wherein the third housing has a passage bore for leadthrough of the ball screw drive, the passage bore having a bore step extending radially inward from a surface of the passage bore, the second housing having a collar positioned in the passage bore in axial contact with and fixed axially between an axial surface of the bore step and a lug of the third housing.

2. The brake pressure control unit as claimed in claim 1, wherein the second housing is, to accommodate the piston, formed as a working cylinder which is closed, adjacent to a centrally arranged main opening, for the delivery of pressure medium by the piston, of which working cylinder there are additionally formed, in the second housing, a first section for accommodating a delivery duct and a second section for accommodating a suction duct.

3. The brake pressure control unit as claimed in claim 1, wherein the third housing is produced from a plastically deformable material which forms the bore step and is displaced by a calking tool onto an oblique shoulder formed on the collar to form the lug.

4. The brake pressure control unit as claimed in claim 1, wherein the second housing is produced from a cast material.

5. The brake pressure control unit as claimed in claim 1, wherein the third housing is composed of a wrought aluminum alloy produced in an extrusion process.

6. The brake pressure control unit as claimed in claim 1, wherein, in the third housing, there are integrated at least two electromagnetically actuatable pressure modulation valves and at least one wheel brake port which is connectable to the wheel brake and which has a hydraulic connection to one of the two pressure modulation valves.

7. The brake pressure control unit as claimed in claim 6, wherein the third housing carries a control unit for the actuation of the pressure modulation valves.

\* \* \* \* \*